United States Patent
Pauli et al.

(10) Patent No.: US 6,327,525 B1
(45) Date of Patent: Dec. 4, 2001

(54) VEHICLE SUSPENSION RIDE CONTROL DIAGNOSTIC TESTING

(75) Inventors: Allen Joseph Pauli, Macomb Township; Patrick Joseph Dwan, South Lyon, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/635,826

(22) Filed: Aug. 10, 2000

(51) Int. Cl.$^7$ .................................................... G01M 17/04
(52) U.S. Cl. ................ 701/29; 701/33; 701/37; 73/11.04; 73/11.08; 280/5.514
(58) Field of Search ................... 701/29, 30, 33, 701/37, 38, 39; 280/5.5, 5.506, 5.512, 5.514, 5.515; 73/11.04, 11.07, 11.08

(56) References Cited

U.S. PATENT DOCUMENTS

| | | | |
|---|---|---|---|
| 3,987,659 | 10/1976 | McKenney et al. | 73/11 |
| 4,703,645 | 11/1987 | Hudacsek et al. | 73/11 |
| 5,056,024 | 10/1991 | Stuyts | 364/424.03 |
| 5,109,692 | 5/1992 | Fitzgerald | 73/168 |
| 5,648,902 | 7/1997 | Honda | 364/424.034 |
| 5,919,238 | 7/1999 | Lavey | 701/29 |
| 5,985,453 | * 2/1999 | Harada et al. | 280/124.161 |

* cited by examiner

Primary Examiner—Tan Nguyen
(74) Attorney, Agent, or Firm—Gregory P. Brown

(57) ABSTRACT

A method (60) of testing a ride control suspension component of a vehicle. The method comprises the steps of setting a vehicle suspension to a first ride mode (70), raising the first suspension to a first height (108), releasing fluid from the first suspension to lower the first suspension (130), and measuring a parameter during the lowering of the first suspension (132). The method further includes the steps of setting the first suspension to a second ride mode which is different than the first ride mode (76), raising the first suspension for a second time (108), releasing pressure from the first suspension to lower the first suspension for a second time (130), measuring a second parameter during the lowering of the first suspension (132), comparing the first and second parameters (82), and determining the condition of a suspension component based on the comparison (84).

18 Claims, 4 Drawing Sheets

VEHICLE SUSPENSION RIDE CONTROL DIAGNOSTIC TESTING

FIELD OF THE INVENTION

The present application generally relates to diagnostic testing of vehicle suspension systems and, more particularly, to a method of testing the ride control of an adjustable suspension on a vehicle.

BACKGROUND OF THE INVENTION

Automotive vehicles commonly employ a suspension system connected between the road wheels and the body of the vehicle. Some vehicles employ an adjustable suspension that is adjustable to a plurality of ride control modes to vary the stiffness of the vehicle suspension. For example, the suspension may be adjusted to vary the shock absorption stiffness to any one of a firm (stiff) mode, an intermediate (normal) mode, and a plush (soft) mode. The various ride control modes allow the vehicle suspension to be adjusted to suit the particular needs of the passengers, depending on the conditions of the roadway and the passengers' comfort level, to thereby enhance the vehicle driving experience.

In order to select a ride control mode, the vehicle operator may manually enter the desired mode, or the vehicle may automatically change modes based on sensed conditions. According to one adjustable suspension system, a change in selection of the ride control mode changes the size of an orifice in a fluid flow path within each of the shock absorbers associated with the rear and/or front suspension of the vehicle. The change in the size of the orifice, in turn, adjusts the hydraulic fluid flow rate within the shock absorber which changes the stiffness of the shock absorber and therefore changes the suspension stiffness.

Conventional shock absorbers typically have a limited operating life, and therefore may need to be replaced when they no longer function properly. In order to determine if a shock absorber needs to be replaced, the conventional diagnostic testing approach typically involves a technician applying force to the vehicle fender, or elsewhere on the vehicle body, while the suspension is set to a first ride mode, and visually detecting the rocking movement response of the vehicle. The technician then selects a different ride mode and repeats the visual inspection. If the visual inspection detects a sufficient difference in vehicle rocking between the different modes, the shock absorber is determined to operate adequately. In an insufficient difference is detected, the suspension is determined to be defective. The conventional suspension testing approach therefore involves subjective interpretation by the technician which may not be consistently reliable.

It is therefore desirable to provide for an accurate test procedure for testing the ride control of suspension components on a vehicle to determine whether the ride control adjustment is functioning properly. In addition, it is desirable to provide for a test procedure for testing vehicle suspension components that does not require subjective interpretation by a technician.

SUMMARY OF THE INVENTION

The present invention provides for a method of testing a ride control suspension component of a vehicle. The method comprises the steps of setting a vehicle suspension to a first ride mode, raising the first suspension to a first height, lowering the first suspension, and measuring a parameter during the lowering of the first suspension. The method also includes the steps of setting the first suspension to a second ride mode which is different than the first ride mode, raising the first suspension to the first height, lowering the first suspension, and measuring a second parameter during the lowering of the first suspension. The method further includes comparing the first and second parameters, and determining the condition of a suspension component based on the comparison. The test method determines whether the ride control modes are functioning properly.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
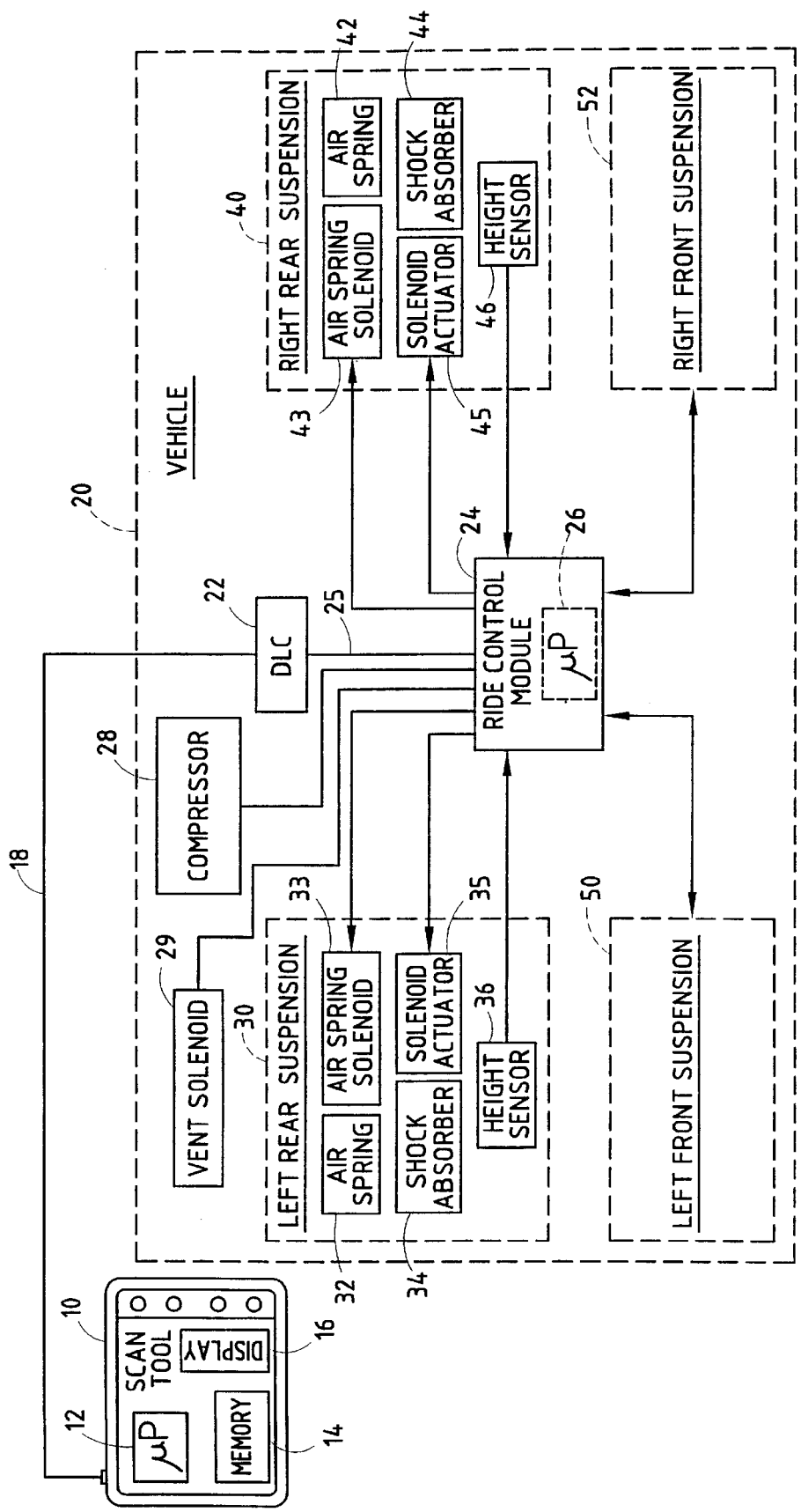
FIG. 1 is a block diagram illustrating a diagnostic tool coupled to an adjustable suspension of a vehicle for performing a diagnostic test routine according to the present invention.

Referring to FIG. 1, an automotive vehicle is generally shown indicated by reference numeral 20. A diagnostic scan tool 10 is shown connected to vehicle 20 to perform diagnostic testing of one or more ride control suspension components of the vehicle suspension system as described herein according to the present invention. While an externally connected hand held diagnostic scan tool 10 is shown and described herein, various types of off board diagnostic tools, as well as on board devices, may be employed to perform the diagnostic test routine of the present invention. In addition, while an adjustable suspension is shown having a pneumatic spring and an adjustable hydraulic shock absorber for each of the rear front, left front, right rear, and left rear suspensions, the diagnostic test routine may be employed to test the ride control for one or more suspensions on an adjustable suspension system for ride control diagnostic purposes.

The diagnostic scan tool 10 includes a microprocessor-based controller 12, memory 14, and a display 16. Diagnostic test routines are stored in memory 14 and processed by controller 12. In addition, memory 14 may store data, including the diagnostic test results, acquired during the diagnostic test. Information such as measured data and diagnostic messages may be displayed to a technician via display 16. It should further be appreciated that the scan tool 10 has various inputs and outputs (not shown). The scan tool 10 is externally connected to the vehicle 20 via communication link 18.

The vehicle 20 is preferably equipped with a data link connector (DLC) 22 that is adapted to connect to communication link 18 to allow interfacing with the scan tool 10. The DLC 22 in turn is connected to a vehicle communication bus 25 which interfaces with the ride control module 24. The ride control module 24 controls the adjustable suspension components including control of the pneumatic suspension and control of the ride control modes of the shock absorbers located on the vehicle. Ride control module 24 preferably includes a microprocessor based controller 26 as is generally known in the vehicle suspension art.

The vehicle 20 is illustrated having a left rear suspension 30 coupled to the left rear road wheel, a right rear suspension 40 coupled to the right rear road wheel, a left front suspension 50 coupled to the left front road wheel, and a right front suspension 52 coupled to the right front road wheel. Each of the suspensions 30, 40, 50, and 52 includes an air (pneumatic) spring, an air spring solenoid, a shock absorber, a solenoid actuator, and a height sensor. As shown, the left rear suspension 30 employs an air spring 32, an air spring solenoid 33, a shock absorber 34, a solenoid actuator 35, and a height sensor 36. The air spring solenoid 33 controls the expansion of air in a diaphragm in the air spring 32. The solenoid actuator 35 controls the size of an orifice within the shock absorber 34 for adjusting hydraulic fluid flow rate to change dampening of the shock absorber 34. The height sensor 36 measures the height of the left rear shock absorber and provides a height measurement signal to the ride control module 24.

The right rear suspension likewise includes an air spring 42, an air spring solenoid 43, a shock absorber 44, a solenoid actuator 45, and a height sensor 46. The air spring solenoid 43 controls the expansion of air in a diaphragm in the air spring 42. The solenoid actuator 45 controls the size of an orifice within shock absorber 44 to adjust the hydraulic fluid flow rate and change dampening of the shock absorber 44. The height sensor 46 likewise measures the height of the right rear shock absorber and provides a height measurement signal to the ride control module 24. It should be appreciated that each of the left front suspension 50 and right front suspension 52 may likewise employ similar components as described in connection with left and right rear suspensions 30 and 40.

The vehicle 20 further includes an air compressor 28 and an air vent solenoid 29, both responsive to control signals generated by the ride control module 24. The compressor 28 generates a supply of compressed air which is transported through air lines (not shown) to the individual suspensions 30, 40, 50, and 52 for use in expanding the air springs. The vent solenoid 29 controls the opening to a vent port that allows for the venting of air from the air suspension systems through the air lines to the outside atmosphere.

Figure 2:
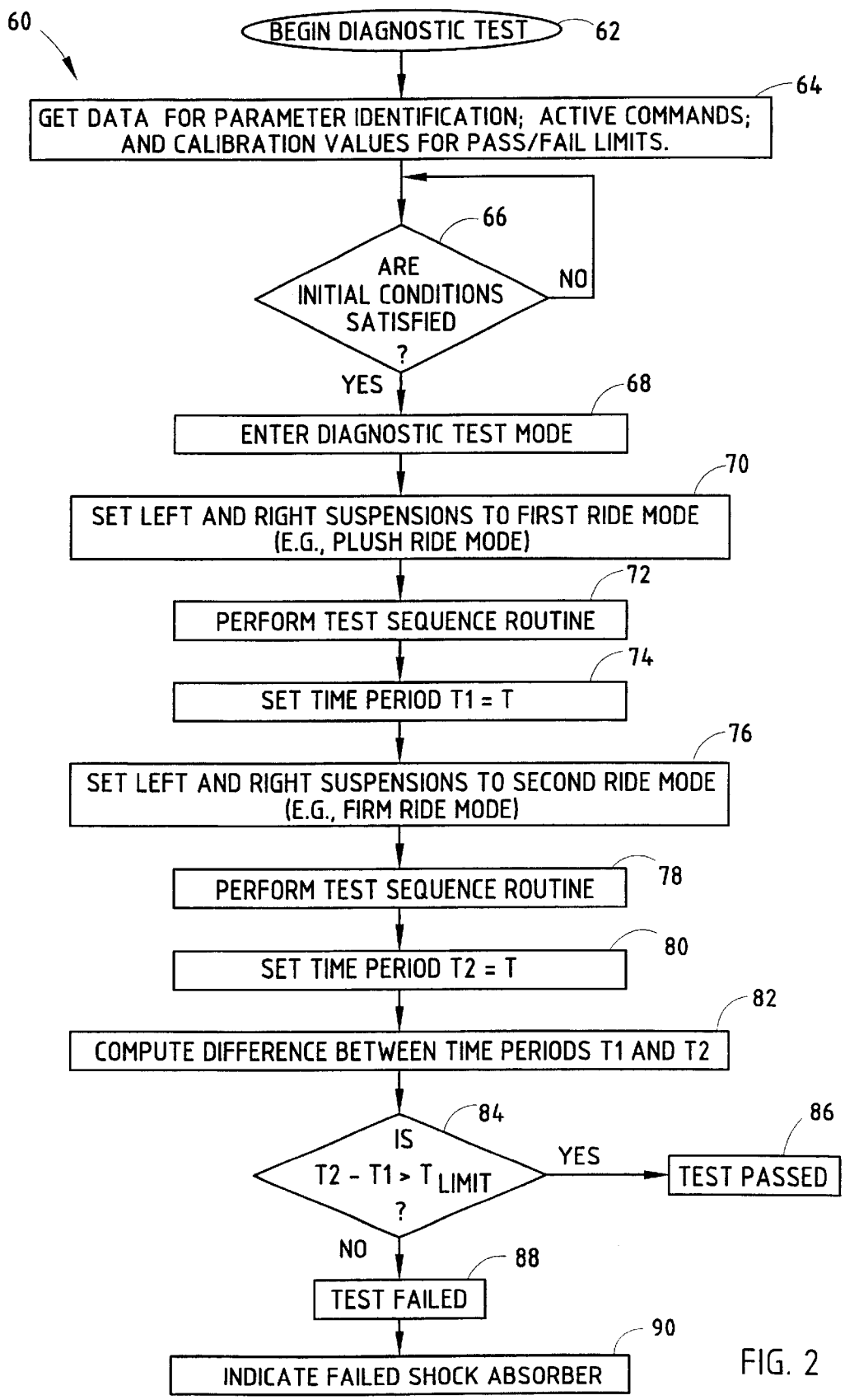
FIG. 2 is a flow diagram illustrating a routine for performing a diagnostic test according to the present invention.

Referring to FIG. 2, a diagnostic test routine 60 is illustrated for testing the ride control suspension components, particularly those components associated with the shock absorber, for the left rear suspension of the vehicle 20. The diagnostic test routine 60 is performed by the scan tool 10 upon request by a technician. Routine 60 begins with step 62 and proceeds to step 64 to get initialization data for parameter identification (PID), active commands, and calibration values for pass/fail limits. Thereafter, in decision step 66, the diagnostic test routine 60 checks for whether all initial condition requirements are satisfied and, if not, waits until the initial conditions are satisfied. Once the initial conditions are satisfied, routine 60 proceeds to step 68 to enter the diagnostic test mode.

Figure 3A:
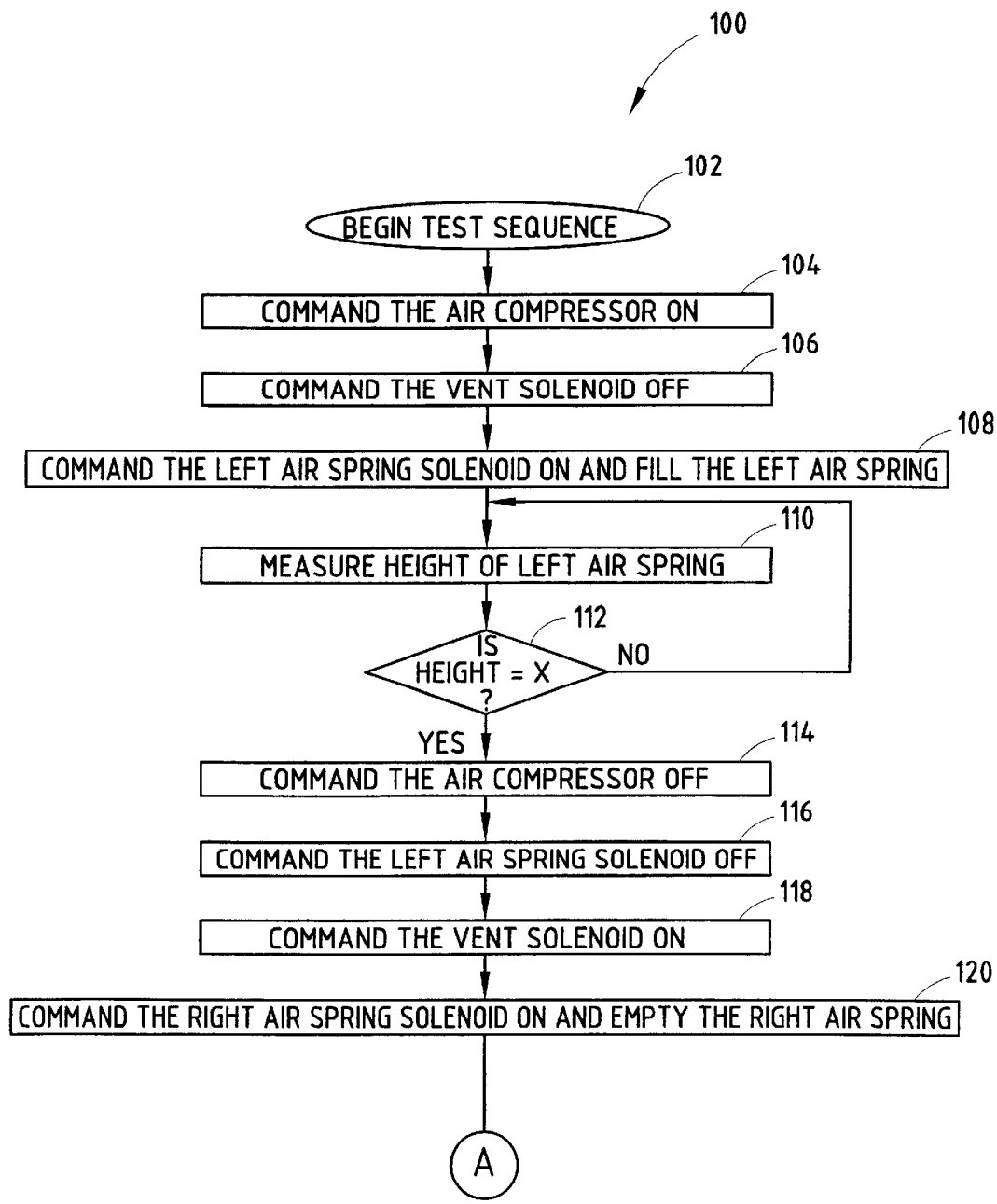
FIGS. 3A and 3B is a flow diagram further illustrating the diagnostic routine for testing vehicle suspension components according to the present invention.
Figure 3B:
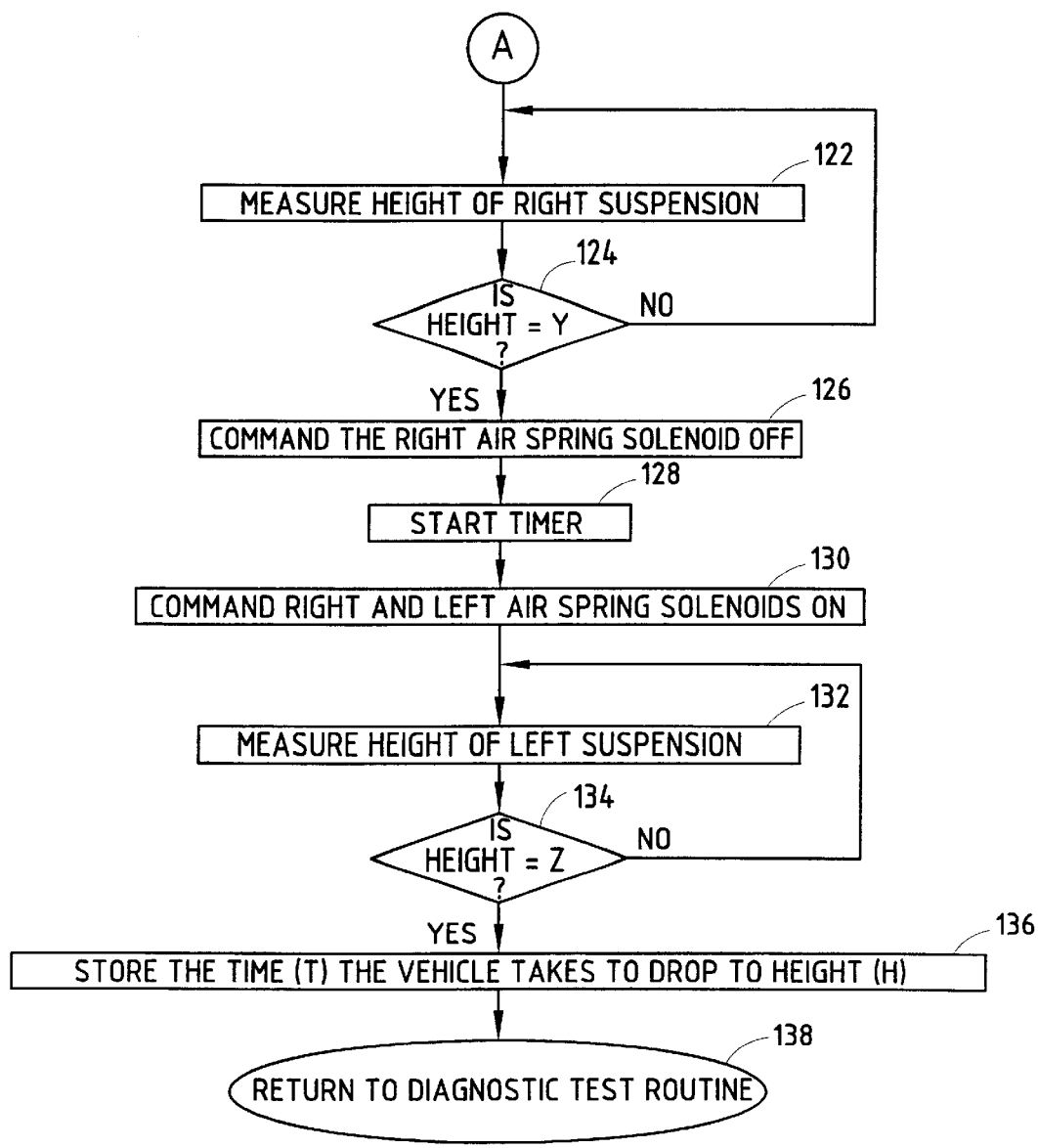

In the diagnostic test mode, the routine 60 proceeds to step 70 to set both the left rear suspension and right rear suspension to a first ride mode, such as the plush (i.e., soft) ride mode. While in the first ride mode, the test sequence routine is performed for the first time in step 72. The test sequence routine, which is illustrated in FIGS. 3A and 3B, generates a time period T which is set equal to time period T1 in step 74. Proceeding to step 76, both the left and right rear suspensions are set to a second ride mode, such as the firm (i.e., stiff) ride mode. In the second ride mode, the test sequence routine is performed for a second time in step 78. The test sequence routine generates a time period T which is then set equal to time period T2 in step 80. In step 82, the difference between time periods T1 and T2 are computed. In decision step 84, routine 60 determines whether the difference in time periods T2−T1 is greater than a predetermined time limit ($T_{LIMIT}$) and, if so, determines a test passed condition in step 86. If the difference in time period T2−T1 is not greater than time limit $T_{LIMIT}$, routine 60 proceeds to determine a test failed condition 88, and then proceeds to step 90 to indicate that the shock absorber has failed the test. At the completion of the diagnostic test routine and upon detecting a failed shock absorber, a technician may then be informed that the failed shock absorber should be replaced or repaired.

Referring to FIGS. 3A and 3B, the test sequence routine 100 initiated in steps 72 and 78 of routine 60 is illustrated therein. Test sequence 100 begins with step 102 and proceeds to step 104 to command the air compressor on so as to generate a supply of compressed air, and, in step 106, commands the vent solenoid off (closed) so as to trap compressed air in the air lines. In step 108, the left air spring solenoid is commanded on (opened) to allow compressed gas to enter the air spring diaphragm and fill the left air spring to thereby raise the left suspension. In step 110, the height of the left suspension is measured. Routine 100 proceeds to decision step 112 to check if the measured height is greater than a predetermined height X and, if not, returns to step 110 until the measured height equals height X. Once the measured height equals height X, routine 100 proceeds to step 114 to command the air compressor off. In step 116, the left air spring solenoid is commanded off to trap the compressed air in the left air spring and thereby maintain the height of the left suspension. In step 118, the vent solenoid is commanded on (opened) to bleed air pressure out of the air line. Proceeding to step 120, the right air spring solenoid is commanded on (opened) to empty the right air spring to lower the right suspension. In step 122, routine 100 measures the height of the right suspension. In decision step 124, routine 100 determines if the measured height of the right suspension is equal to a predetermined height Y and, if not, returns to step 122 until the measured height equals height Y. If the measured height equals height Y, routine 100 proceeds to step 126 to command the right air spring solenoid off (closed) to trap the right air spring at the low height position Y. A timer is started in step 128 and, in step 130, the right and left air spring solenoids are commanded on to allow the left suspension to drop due to gravitational force. Routine 100 measures the height of the left suspension in step 132. In decision step 134, routine 100 checks for whether the measured height of the left suspension is equal to a predetermined height Z and, if not, returns to step 132 until the measured height equals Z. Once the measured height equals height Z, routine 100 stores the time T that the left suspension of the vehicle takes to drop by height H=X−Z, in step 136. Thereafter, routine 100 returns in step 138 to the diagnostic test routine 60 shown and described in connection with FIG. 2.

The method of the present invention advantageously tests the ride control suspension components of a vehicle, such as the shock absorber, to determine if the ride suspension is operating properly in the various ride control modes. The method sets a first suspension of the vehicle to a first ride mode, applies fluid pressure to raise the first suspension, and then releases pressure to lower the first suspension and, at the same time, measures a parameter, such as time, during the lowering of the first suspension. The method also includes the steps of setting the first suspension to a second ride mode which is different than the first mode, reapplying fluid pressure to raise the first suspension, again releasing pressure to lower the first suspension, and measuring a second parameter, such as time, during the lowering of the first suspension. The first and second parameters are compared, and the presence of a faulty suspension component is determined based on the comparison.

The above-described embodiment measures the time period during which the suspension drops to a predetermined height in different ride modes to determine if the ride control modes are functioning properly. Alternately, it should be appreciated that the diagnostic method of the present invention may monitor other parameters such as change in height over a predetermined time period, as well as other parameters without departing from the spirit of the present invention. It should be appreciated that one of the right and left suspensions is diagnosed for ride control functionality by monitoring the free fall response during different modes, while the other of the left and right suspensions is maintained in a lowered position so as to advance the rate of drop of the other suspension. It should also be appreciated that while testing of the left rear suspension is shown and described herein, the above-described invention is applicable to any of the rear and front suspensions on a vehicle.

Accordingly, the diagnostic test routine of the present invention advantageously determines whether the ride control suspension components of an adjustable suspension system in a vehicle are functioning properly. In particular, the diagnostic test methodology is able to determine whether the various ride modes are achieved with the adjustable suspension system, without requiring on-road operation of the vehicle.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A method of testing the ride control of a suspension on a vehicle, said method comprising the steps of:
    setting a first suspension of a vehicle to a first ride mode;
    raising said first suspension to a first height for a first time;
    lowering said first suspension for a first time;
    measuring a parameter during said lowering of said first suspension for the first time;
    setting said first suspension to a second ride mode which is different than said first ride mode;
    raising said first suspension to said first height for a second time;
    lowering said first suspension for a second time;
    measuring a second parameter during said lowering of said first suspension for the second time;
    comparing said first and second parameters; and
    determining the presence of a faulty suspension component based on said comparison.

2. The method as defined in claim 1, wherein said first and second parameters each comprise a time period.

3. The method as defined in claim 1, wherein said first and second parameters each comprise a height measurement.

4. The method as defined in claim 1 further comprising the step of communicating with a vehicle ride control module via an external diagnostic tool.

5. The method as defined in claim 1, wherein said step of raising said first suspension comprises applying fluid pressure to a fluid spring.

6. The method as defined in claim 5, wherein said fluid comprises air.

7. The method as defined in claim 1 further comprising the steps of lowering a second suspension prior to said steps of lowering said first suspension.

8. The method as defined in claim 7, wherein said first suspension comprises one of a left and right suspension, and the second suspension comprises the other of the left and right suspension.

9. A method of testing the ride control of a suspension on a vehicle, said method comprising the steps of:
    setting a first suspension of a vehicle to a first ride mode;
    applying fluid pressure to said first suspension to raise said first suspension to a first height for a first time;
    releasing fluid pressure from said first suspension to lower said first suspension for a first time;
    measuring a parameter during said lowering of said first suspension for the first time;
    setting said first suspension to a second ride mode which is different than said first ride mode;
    applying fluid pressure to said first suspension to raise said first suspension to said first height for a second time;
    releasing pressure from said first suspension to lower said first suspension for a second time;
    measuring a second parameter while said first suspension is lowered for the second time;
    comparing said first and second parameters; and
    determining the presence of a faulty suspension component based on said comparison.

10. The method as defined in claim 9, wherein said first and second parameters comprise time periods.

11. The method as defined in claim 9, wherein said first and second parameters comprise height measurements.

12. The method as defined in claim 9 further comprising the step of communicating with a vehicle ride control module via an external diagnostic tool.

13. The method as defined in claim 9, wherein said fluid comprises air.

14. A method of testing the ride control of a suspension on a vehicle, said method comprising the steps of:
    setting a first suspension of a vehicle to a first ride mode;
    applying fluid pressure to said first suspension to raise said first suspension to a first height for a first time;
    releasing fluid pressure from said first suspension to lower said first suspension for a first time;
    releasing fluid pressure from a second suspension prior to lowering the first suspension;
    measuring a parameter during the lowering of the first suspension for the first time;
    setting said first suspension to a second ride mode which is different than said first ride mode;
    applying fluid pressure to said first suspension to raise said first suspension to said first height for a second time;
    releasing fluid pressure from said first suspension to lower said first suspension for a second time;
    measuring a second parameter while said first suspension is lowered for the second time;
    comparing said first and second parameters; and determining the presence of a faulty suspension component based on said comparison.

15. The method as defined in claim 14 further comprising the step of releasing fluid pressure from said second suspension prior to lowering said first suspension for the second time.

16. The method as defined in claim 14, wherein said first suspension comprises one of a left suspension and a right suspension, and the second suspension comprises the other of the left suspension and right suspension.

17. The method as defined in claim 14, wherein said first and second parameters comprise time periods.

18. The method as defined in claim 14, wherein said fluid comprises air.

* * * * *